United States Patent
Seo (10) Patent No.: US 9,100,691 B2
(45) Date of Patent: Aug. 4, 2015

(54) DIGITAL CONTENT DISPLAY SYSTEM AND METHOD FOR PROVIDING INFORMATION DURING A CHANNEL ZAPPING DELAY

(75) Inventor: Hyungjin Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/542,257

(22) Filed: Jul. 5, 2012

(65) Prior Publication Data

US 2013/0014156 A1    Jan. 10, 2013

(30) Foreign Application Priority Data

Jul. 5, 2011    (KR) .................. 10-2011-0066253

(51) Int. Cl.
| | | |
|---|---|---|
| *H04N 7/10* | (2006.01) | |
| *H04N 7/025* | (2006.01) | |
| *H04N 21/438* | (2011.01) | |
| *H04N 21/236* | (2011.01) | |
| *H04N 21/237* | (2011.01) | |
| *H04N 21/44* | (2011.01) | |
| *H04N 21/4722* | (2011.01) | |
| *H04N 21/4782* | (2011.01) | |
| *H04N 21/61* | (2011.01) | |
| *H04N 21/858* | (2011.01) | |

(52) U.S. Cl.
CPC ......... *H04N 21/4384* (2013.01); *H04N 21/236* (2013.01); *H04N 21/237* (2013.01); *H04N 21/44016* (2013.01); *H04N 21/4722* (2013.01); *H04N 21/4782* (2013.01); *H04N 21/6125* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 7,237,251 B1 * | 6/2007 | Oz et al. | 725/40 |
| 2010/0017443 A1 * | 1/2010 | Xie et al. | 707/201 |
| 2010/0037267 A1 * | 2/2010 | Bennett | 725/56 |

* cited by examiner

*Primary Examiner* — Nasser Goodarzi
*Assistant Examiner* — Adil Ocak
(74) *Attorney, Agent, or Firm* — The Farrell Law Firm, P.C.

(57) ABSTRACT

A digital content display system and a method for providing information during a channel zapping delay are provided. The information providing method includes receiving information to be displayed during a channel zapping delay; displaying the information during the channel zapping delay, when performing a channel switching operation to a new channel; and outputting content corresponding to the new channel.

18 Claims, 7 Drawing Sheets

DIGITAL CONTENT DISPLAY SYSTEM AND METHOD FOR PROVIDING INFORMATION DURING A CHANNEL ZAPPING DELAY

PRIORITY

This application claims priority under 35 U.S.C. §119(a) to Korean Patent Application No. 10-2011-0066253, which was filed in the Korean Intellectual Property Office on Jul. 5, 2011, the entire disclosure of which is hereby incorporated by reference.

BACKGROUND OF THE INVENTION

1. Field of the Invention

The present invention relates generally to content display systems, and more particularly, to a system and method that provides information to a user during a channel zapping delay, when channel is changed in a digital broadcast.

2. Description of the Related Art

Switching channels by a receiver in a digital broadcasting system is performed by searching for a Program IDentification number (PID) of a switched to channel. However, searching for a PID causes a delay in receiving content from the switched to channel. Further, this delay increases while received data is converted to reproducible video/audio signals. Additionally, these processes are performed each time a user switches channels in a digital broadcasting system.

Consequently, channel switching is slower in digital broadcasting system than in an analog broadcasting system. It is common for a conventional digital content display device to have a delay time of approximately 2 seconds before content from the switched to channel is displayed. In digital broadcasting systems, the time required for channel switching is referred to as a "channel zapping delay".

During the channel zapping delay, conventional digital broadcast devices merely show a black screen via a display. Accordingly, viewers who are accustomed to rapid channel switching, as in an analogue broadcasting system, often feel that the zapping delay is too long and dislike the black screen state.

Additionally, a web browser may be installed in a digital broadcast receiving device, which makes it possible for a user to surf web pages mapped to web channels, similar to the switching of TV channels. However, surfing web pages via a web browser also has a zapping delay time.

SUMMARY OF THE INVENTION

The present invention has been designed to address at least the above-identified problems occurring in the prior art, and to provide at least the advantages described below.

Accordingly, an aspect of the present invention is to provide a digital content display system and method that provide user requested information to a user during a channel zapping delay.

Another aspect of the present invention is to provide a zapping method for searching for web pages via a web browser installed in a digital content display system, and rapidly switching channels to find a corresponding broadcast program.

In accordance with an embodiment of the invention, a method of providing information via a digital content display system is provided. The method includes receiving information to be displayed during a channel zapping delay; displaying the information during the channel zapping delay, when performing a channel switching operation to a new channel; and outputting content corresponding to the new channel.

In accordance with another embodiment of the invention, a digital content display system is provided, which includes a digital broadcast receiver that receives digital broadcast signals; a communication unit that transmits and receives data and the digital broadcast signals; a browser engine that browses web pages according to a user browsing request; a storage unit that stores an application program and data; and a controller that receives information to be displayed during a channel zapping delay, displays the information to be displayed during the channel zapping delay when performing a channel switching operation to a new channel, and outputs content corresponding to the switched channel.

BRIEF DESCRIPTION OF THE DRAWINGS

The above and other aspects, features, and advantages of the present invention will become more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein are omitted to avoid obscuring the subject matter of the present invention in unnecessary detail.

Herein, the term "channel" refers to a channel that outputs digital broadcast content in a digital content display system, and does not refer to a transmission channel. For example, "channel" refers to a digital broadcast channel assigned to a broadcasting station or program and refers a content channel assigned to digital content, web pages mapped to a web channel like a TV channel, etc.

The phrase "channel switching" refers to a process where one channel is switched to another channel.

The phrase "push server" refers to a server that receives and updates web pages related to preset information, and transmits corresponding information to the digital content display system.

In the following description, information to be provided to a user during channel switching may be a preview for a next channel, a user's set favorite information (e.g., weather, stock information, fortune-telling, etc.), a web page summarizing a web channel, a web page set via Open Application Programming Interface (API), etc., a web page designated by a service provider, etc. Further, the information may be displayed in the digital content display system as text, images, Uniform Resource Locators (URLs), snapshots, web pages, etc.

The term "snapshot" refers to an information item that is created as acquired information is edited so that the user can quickly recognize the acquired information during the channel zapping delay.

Figure 1:
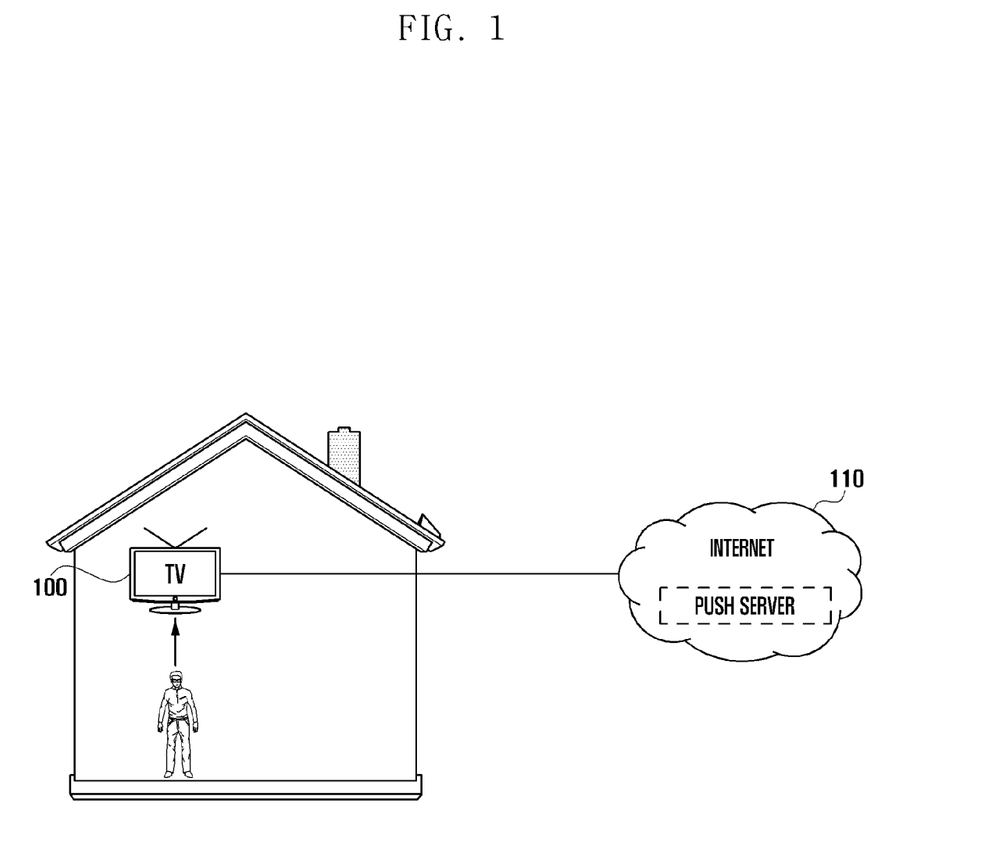
FIG. 1 illustrates a system that provides information during a channel zapping delay in a digital content display system according to an embodiment of the present invention.

FIG. 1 illustrates a system that provides information during a channel zapping delay in a digital content display system according to an embodiment of the invention.

Referring to FIG. 1, the digital content display system includes a digital TV 100 connected to the Internet 110.

Figure 2:
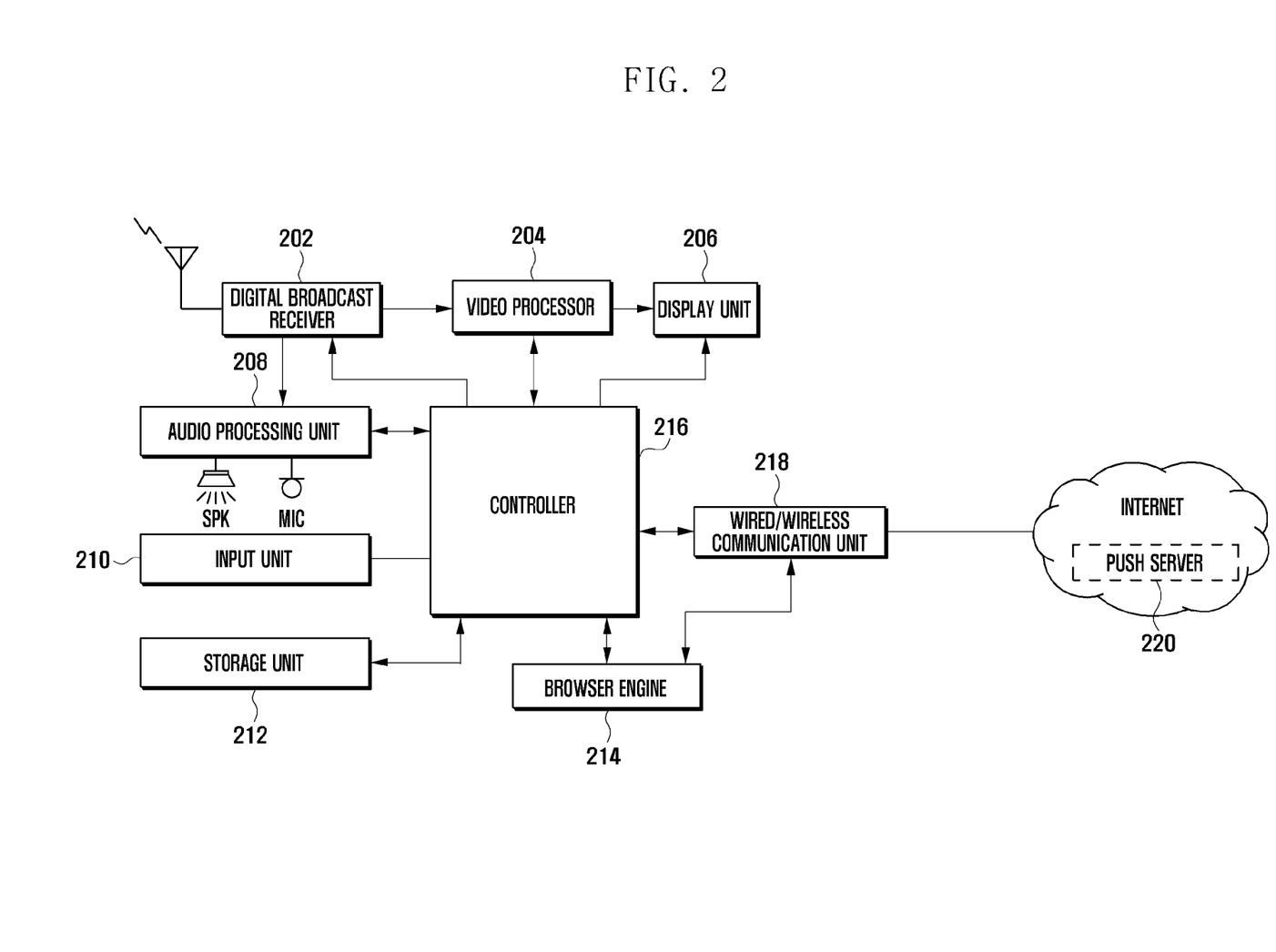
FIG. 2 is a block diagram illustrating a digital content display system according to an embodiment of the present invention.

FIG. 2 is a block diagram illustrating a digital content display system according to an embodiment of the invention.

Referring to FIG. 2, the digital content display system includes a digital broadcast receiver 202, a video processor 204, a display unit 206, an audio processing unit 208, an input unit 210, a storage unit 212, a browser engine 214, a controller 216, a wired/wireless communication unit 218. and a push server 220.

The digital broadcast receiver 202 receives digital broadcast signals and separates them into audio and video signals, which are output to the audio processing unit 208 and the video processor 204, respectively. The digital broadcast receiver 202 receives digital broadcast signals corresponding to a user selected channel.

The video processor 204 decodes the video signals to be displayed on the display unit 206.

The display unit 206, which may be a Liquid Crystal Display (LCD), an Organic Light Emitting Diode (OLED), an Active Matrix Organic Light Emitting Diodes (AMOLED), etc., displays the decoded video signals output from the video processor 204. For example, the display unit 206 displays video data related to icons, animation, videos, images, and texts received via the wired/wireless communication unit 218. The display unit 206 displays information regarding the states and operations of the digital content display system. The display unit 206 receives and displays digital broadcast content corresponding to a user selected channel from the video processor 204. Additionally, the display unit 206 receives and displays information from the wired/wireless communication unit 218.

The audio processing unit 208 reproduces audio signals, output from the digital broadcast receiver 202 or the controller 216, and transfers audio signals received via a microphone (MIC) to the controller 216. The audio processing unit 208 converts voice/audio data into audible sounds and outputs them via a speaker (SPK), according to the control of the controller 216. Further, the audio processing unit 208 receives audio signals via the microphone and converts them into audio data. The audio processing unit 208 receives and outputs audio signals of digital broadcast content corresponding to the user selected channel. The audio processing unit 208 converts audio data included in the information received via the wired/wireless communication unit 218 into audible signals, and outputs the audible signals.

The input unit 210 creates signals based on user key operations, and transfers the created to the controller 216. For example, the input unit 210 may be implemented with a remote control device equipped with numeric keys, direction keys, function keys, etc. Basically, the input unit 210 allows a user to input a channel switching command.

When information is displayed on the display unit 206, the user can select it via the input unit 210, thereby viewing corresponding web pages.

The storage unit 212 stores data and programs for controlling the operation and functions of the digital content display system. The storage unit 212 includes a program storage area and a data storage area. The program storage area stores programs for controlling the operation of the digital content display system, and application programs. The data storage area stores data created when the digital content display system is used, e.g., images, videos, audio data, etc. For example, the storage unit 212 may be implemented with volatile storage media or non-volatile storage media or a combination thereof. The volatile storage media may include a semiconductor memory, such as a Random Access Memory (RAM), Dynamic RAM (DRAM), Static RAM (SRAM), etc. The non-volatile storage media may include a hard disk, a Flash NAND memory, etc. The storage unit 212 stores URLs of website servers from which the user acquires corresponding information or a URL of the push server 220 that transmits user requested information. The storage unit 212 stores information transmitted from the website servers or the push server 220, and also digital broadcast content received via the digital broadcast receiver 202.

The browser engine 214 browses websites and accesses user requested websites via the wired/wireless communication unit 218. The browser engine 214 downloads and parses markup data from a corresponding URL. The browser engine 214 lays out and renders the parsed data. The browser engine 214 loads a user set website URL or a URL of the push server 220 from the storage unit 212, while a channel switching command is being input via the controller 216. The browser engine 214 accesses the loaded URL, and acquires and manages corresponding information. When the user has input the channel switching command and then selects corresponding information, the browser engine 214 accesses the website and displays web pages. The browser engine 214 communicates with the push server 220 via the wired/wireless communication unit 218, and receives information from the push server 220 while a channel switching command is being input.

The wired/wireless communication unit 218 receives digital broadcast signals and performs data communication in a wired/wireless mode. The wired/wireless communication unit 218 includes a Radio Frequency (RF) transmitter for up-converting the frequency of signals to be transmitted and amplifying the signals, and an RF receiver for low-noise amplifying received RF signals and down-converting the frequency of the received RF signals. The wired/wireless communication unit 218 receives data from the Internet or the push server 220, and outputs the data to the controller 216 or vice versa.

The controller 216 controls the overall operation of the components in the digital content display system. Specifically, the controller 216 identifies when the user inputs a command to set a channel to provide information and set information to be displayed, and controls the display unit 206 to display a user interface that allows the user to set a channel and information to be displayed, via the input unit 210.

When the system operates in an idle state, the controller 216 controls the browser engine 214 to access a website related to the user set information, as a background, via the wired/wireless communication unit 218, and to acquire information. Accessing a website as a background refers to the system accessing a corresponding website, without a user's input and without displaying the accessing process.

When the system does not operate in an idle state, the controller 216 determines whether the user inputs a channel switching command via the input unit 210.

When the controller 216 determines that the user does not input a channel switching command, the controller 216 performs a corresponding function. However, when the controller 216 determines that the user inputs a channel switching command, the controller 216 determines whether the channel to be switched to is a channel to provide information.

When the controller 216 determines that the channel to be switched to is not a channel to provide information, the controller 216 controls the display unit 206 to display a black screen during the channel zapping delay, i.e., channels are switched in a conventional mode.

When the controller 216 determines that the channel to be switched to is a channel to provide information, the controller 216 controls the display unit 206 to display information acquired during the channel switching process.

The controller 216 determines whether a selection command is input to the input unit 210, when displaying information acquired during the channel switching process. When the controller 216 determines that a selection command is not input, the controller 216 controls the display unit 206 to display information acquired during the channel switching process for a period of time.

After the period of time has elapsed, the controller 216 controls the display unit 206 to display content corresponding to the switched channel.

However, when the controller 216 determines that a selection command is input to the input unit 210, the controller 216 controls the browser engine 214 to access a website via the wired/wireless communication unit 218, and controls the display unit 206 to display web pages from the website.

In accordance with another embodiment of the present invention, the controller 216 controls the browser engine 214 to access the push server 220 via the wired/wireless communication unit 218 and to upload the user set channel and information to be displayed.

Additionally, when the controller 216 determines that the channel to be switched to is a channel to provide information, the controller 216 determines whether the storage unit 212 has sufficient storage space for the information. When the controller 216 determines that the storage unit 212 has sufficient storage space, the controller 216 requests the user's set information from the push server 220 via the wired/wireless communication unit 218. When the push server 220 receives the request, the controller 216 controls the browser engine 214 to receive the information from the push server 220.

However, when the controller 216 determines that the storage unit 212 does not have sufficient storage space, the controller 216 requests a source URL to the push server 220 via the wired/wireless communication unit 218. When the push server 220 receives the request, the controller 216 controls the browser engine 214 to access the URL.

The controller 216 controls the display unit 206 to display information acquired during the channel switching process. When the controller 216 determines that a channel switching operation has been interrupted, the controller 216 determines whether a selection command is input to the input unit 210. When the controller 216 determines that a selection command is not input to the input unit 210, the controller 216 controls the display unit 206 to display information for a period of time.

After the period of time has elapsed, the controller 216 controls the display unit 206 to display the content corresponding to the switched channel.

However, when the controller 216 determines that a selection command is input to the input unit 210, the controller 216 controls the browser engine 214 to access a website via the wired/wireless communication unit 218, and controls the display unit 206 to display the web pages from the website.

The push server 220 provides information during the channel zapping delay in the digital content display system. The push server 220 receives and updates web pages related to preset information, and transmits corresponding information to the digital content display system.

Figure 3:
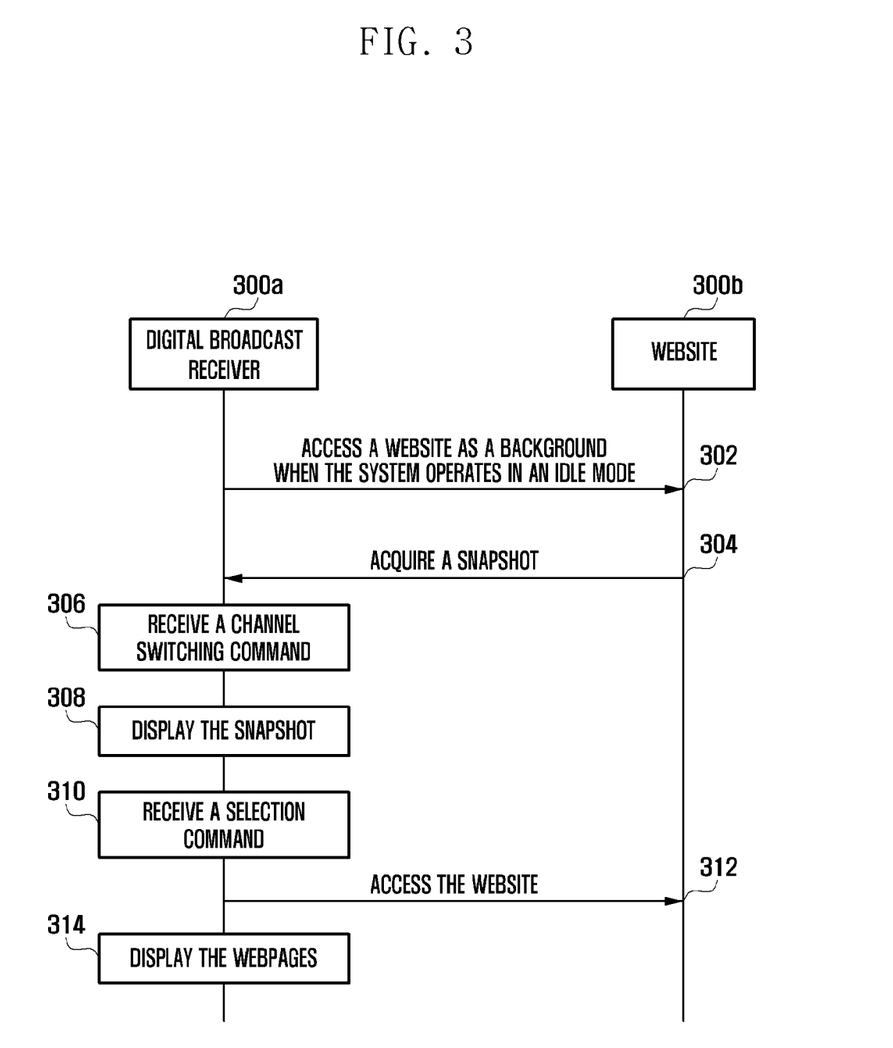
FIG. 3 is a signal flow diagram illustrating a method for receiving information to be displayed during a channel zapping delay, before a channel switching command is input, according to an embodiment of the present invention.

FIG. 3 is a signal flow diagram illustrating a method for receiving information to be displayed during a channel zapping delay, before a channel switching command is input, according to an embodiment of the invention.

Referring to FIG. 3, in an idle mode, a digital broadcast receiver 300a accesses a website 300b as a background operation (in step 302, and acquires a snapshot from the website 300b in step 304.

The digital broadcast receiver 300a receives a user input channel switching command in step 306, and then displays the snapshot in step 308.

The digital broadcast receiver 300a receives a selection command form the user in step 310, accesses the website 300b in step 312, and displays web pages from the website 300b in step 314.

Although FIG. 3 illustrates a snapshot as the type of information being displayed during the channel switching process, it should be understood that the present invention is not limited to this type of information.

Figure 4:
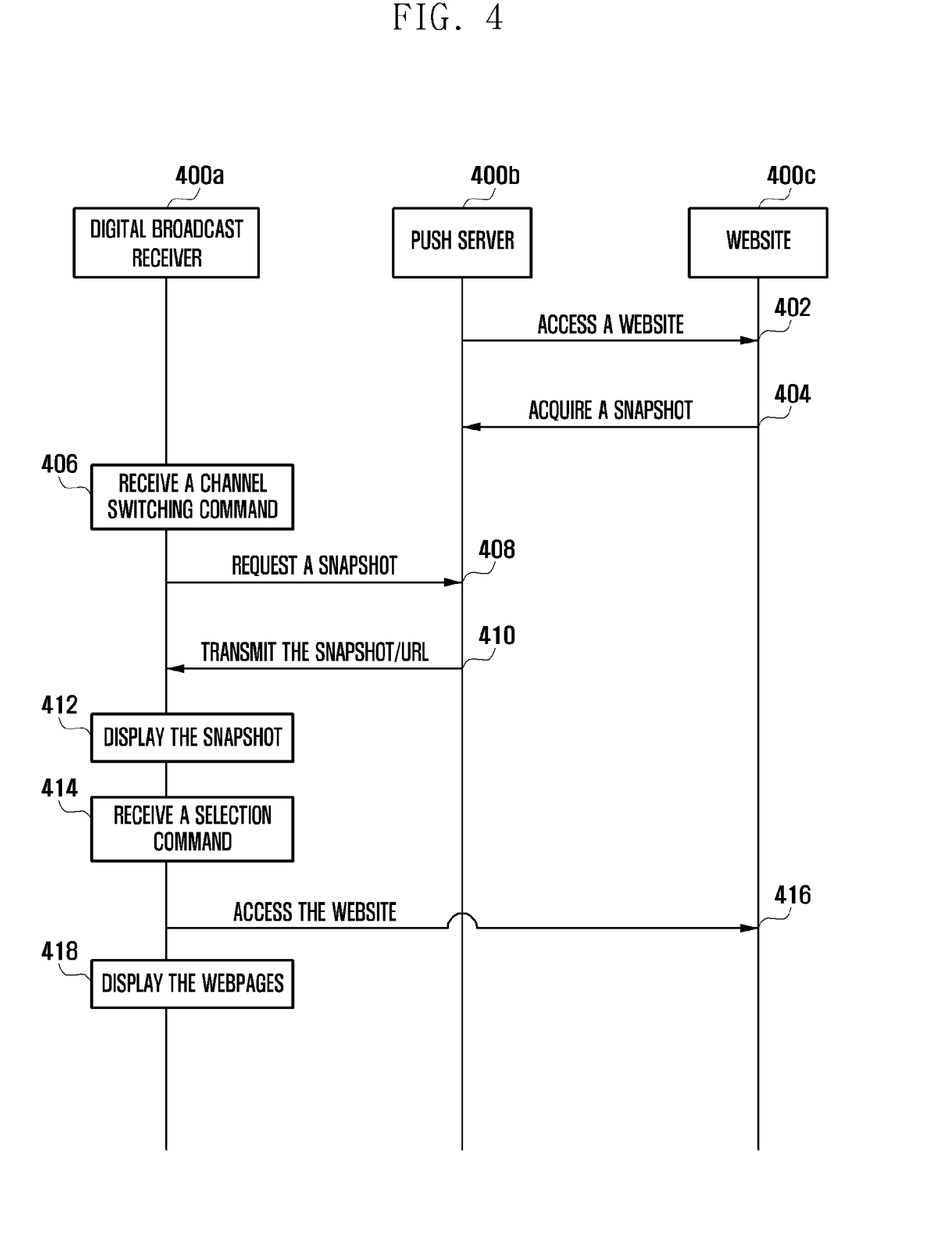
FIG. 4 is a signal flow diagram illustrating a method for requesting and receiving information to be displayed during a channel zapping delay from a push server, after a channel switching command is input, according to an embodiment of the present invention.

FIG. 4 is a signal flow diagram illustrating a method for requesting and receiving information to be displayed during a channel zapping delay from a push server, after a channel switching command is input, according to an embodiment of the invention.

Referring to FIG. 4, a push server 400b accesses a website 400c in step 402, and acquires a snapshot from the website 400b in step 404.

The digital broadcast receiver 400a receives a channel switching command in step 406, and requests a snapshot from the push server 400b in step 408. The push server 400b transmits the snapshot or a URL to the digital broadcast receiver 400a in step 410. The digital broadcast receiver 400a displays the snapshot during the channel switching operation in step 412.

The digital broadcast receiver 400a receives a selection command in step 414, accesses the website 400c in step 416, and displays the web pages from the website 400c in step 418.

Although FIG. 4 illustrates a snapshot as the type of information being displayed during the channel switching process, it should be understood that the present invention is not limited to this type of information.

Figure 5:
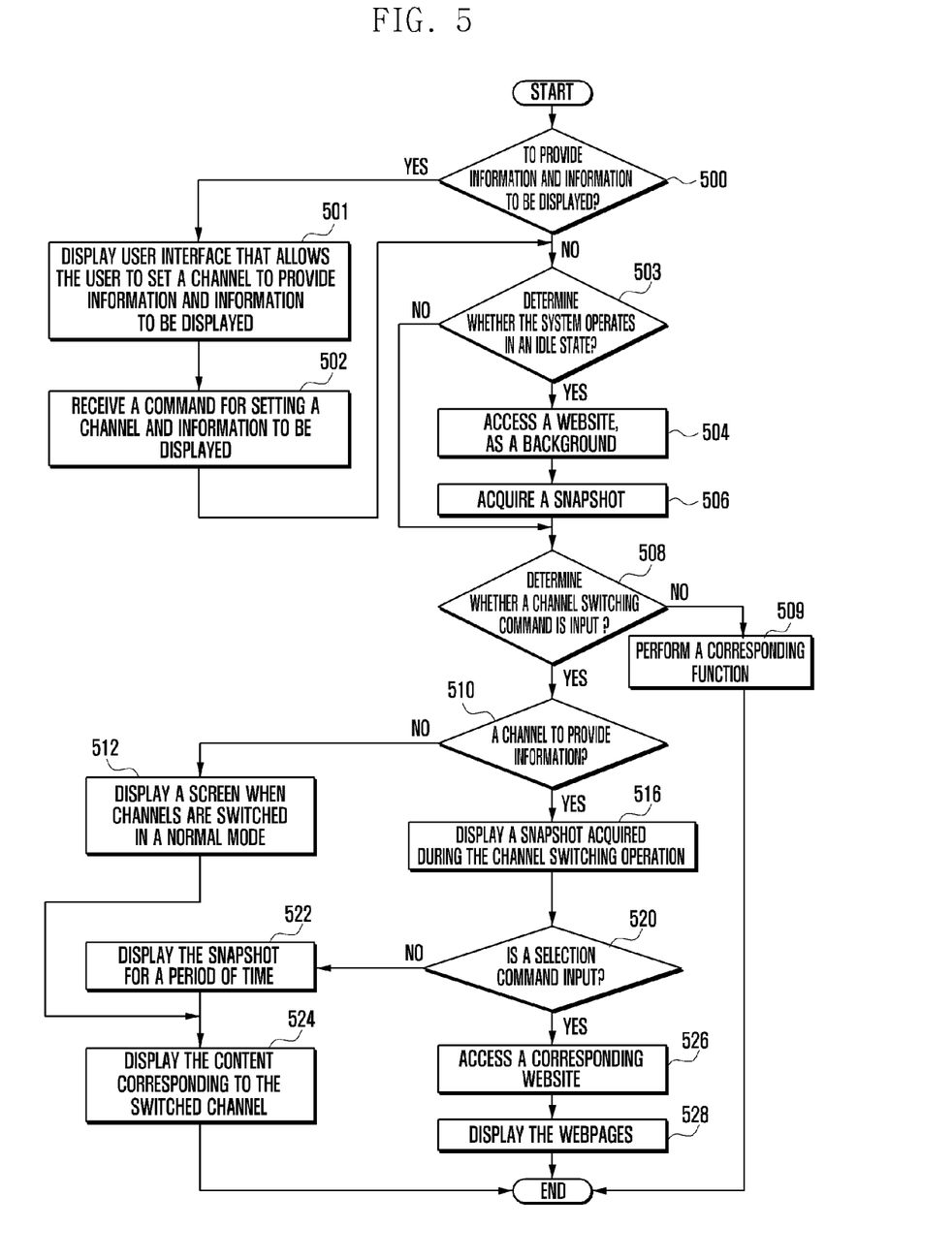
FIG. 5 is a flow chart illustrating a method for providing information during a channel zapping delay in a digital content display system according to an embodiment of the present invention.

FIG. 5 is a flow chart illustrating a method for providing information during a channel zapping delay in a digital content display system according to an embodiment of the invention.

Referring to FIG. 5, in step 500, the controller 216 determines whether a user inputs a command to set a channel to provide information and information to be displayed. When the controller 216 determines that the user inputs the command, in step 501, the controller 216 controls the display unit 206 to display a user interface through which the user sets a channel to provide information and information to be displayed. In step 502, the controller 216 receives a command for setting a channel and information to be displayed.

Specifically, in step 502, the user sets a channel and inputs information to be displayed during a channel switching operation. For example, the information to be set may include a preview regarding a channel or information such as weather, stock updates, news, horoscopes, etc. When the set channel is a web channel, information to be set may include web pages summarizing the web channel. Further, when the user does not set information in the system, information to be set may be web pages set by a service provider. The amount of information the user can set is based on the length of channel zapping delay.

When the controller 216 determines that the user does not input a menu setting selection command in step 500, the controller 216 determines whether the system is operating in an idle state before in step 503. In an idle state, the system does not execute a current job, but has resources to process different operations. In accordance with an embodiment of the invention, in the idle state, the system receives digital broadcast signals and displays them on the display unit 206 without switching channels.

When the controller 216 determines that the system is operating in an idle state in step 503, the controller 216 accesses a website related to the user set information, as a background operation, via the wired/wireless communication unit 218 in step 504. Again, when accessing a website as a background operation, the system accesses a corresponding website, without user input and without displaying the accessing process.

In step 506, the controller 216 controls the browser engine 214 to acquire a snapshot from the accessed website. It should be understood that the browser engine 214 may acquire other information that can be displayed during the channel switching operation, other than or in addition to the snapshot, in step 506.

However, when the controller 216 determines that the system does not operate in an idle state in step 503, or after acquiring the snapshot, the controller 216 determines whether the user inputs a channel switching command via the input unit 210 in step 508. When the controller 216 determines that the user does not input a channel switching command in step 508, the controller 216 performs a corresponding function in step 509.

When the controller 216 determines that the user inputs a channel switching command in step 508, the controller 216 determines whether the channel to be switched to is a channel to provide information in step 510. That is, the controller 216 determines whether to provide a snapshot during the channel switching operation in step 510.

When the controller 216 determines that the channel to be switched to is not a channel to provide information in step 510, the controller 216 controls the display unit 206 to display a screen when channels are switched as in a normal mode, during the channel switching operation in step 512.

In step 524, the controller 216 controls the display unit 206 to display the content corresponding to the switched channel.

When the controller 216 determines that the channel to be switched to is a channel to provide information in step 510, the controller 216 controls the display unit 206 to display a snapshot acquired during the channel switching operation in step 516. When one piece of information is set, the display unit 206 displays only one snapshot. When a number of pieces of information are set, the display unit 206 displays a number of snapshots.

In step 520, the controller 216 determines whether the user inputs a selection command.

When the controller 216 determines that the user does not input a selection command in step 520, the controller 216 controls the display unit 206 to display the snapshot for a period of time in step 522, and to display the content corresponding to the switched channel in step 524, after the period of time has elapsed. The period of time is a channel zapping delay.

When the controller 216 determines that the user inputs a selection command in step 520, the controller 216 controls the browser engine 214 to access a corresponding website via the wired/wireless communication unit 218 in step 526, and controls the display unit 206 to display the web pages from the website in step 528.

Although FIG. 5 illustrates a snapshot as the type of information being displayed during the channel switching process, it should be understood that the present invention is not limited to this type of information.

Figure 6:
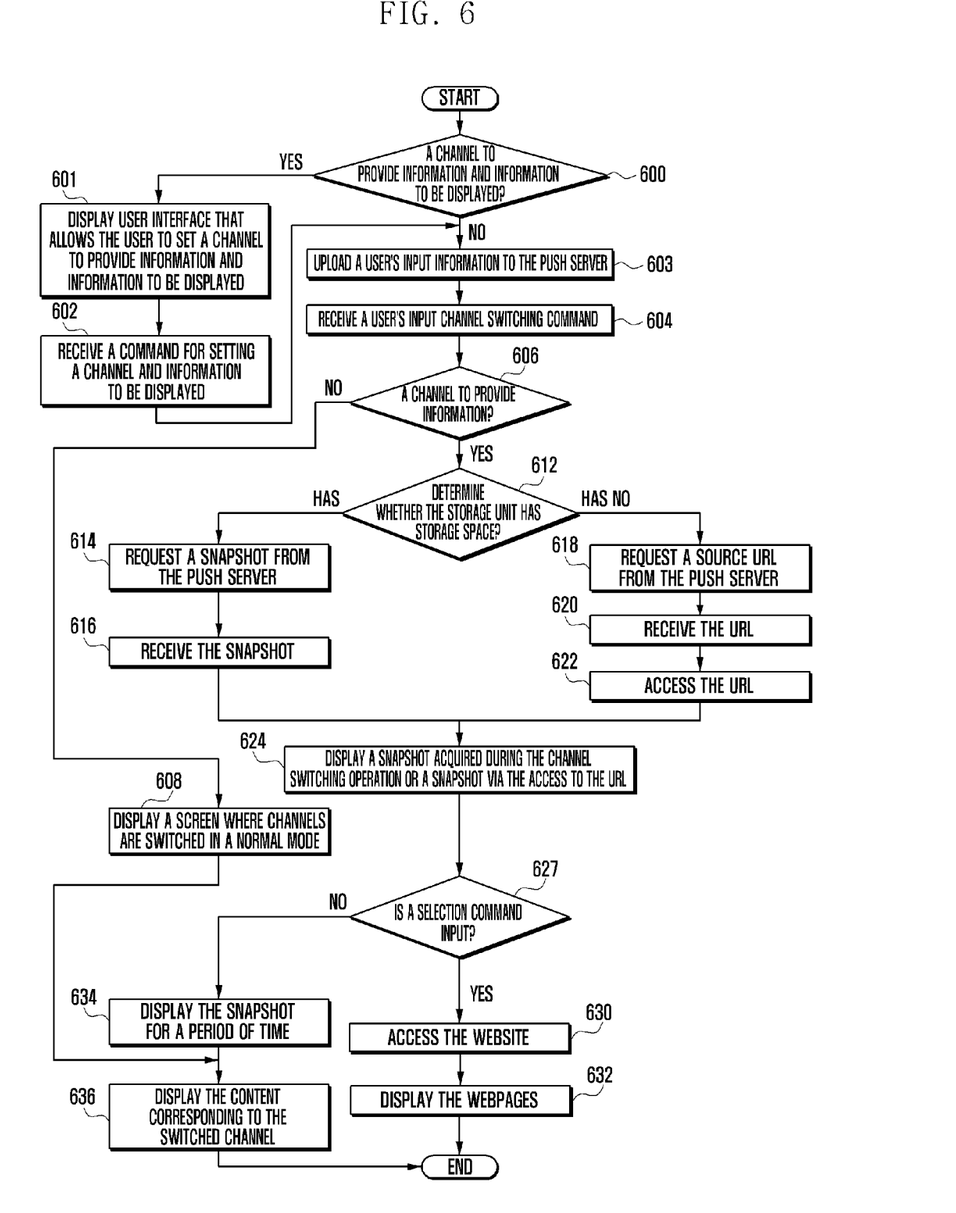
FIG. 6 is a flow chart illustrating a method for providing information during a channel zapping delay in a digital content display system, using a push server, according to an embodiment of the present invention.

FIG. 6 is a flow chart illustrating a method for providing information during a channel zapping delay in a digital content display system, using a push server, according to an embodiment of the invention.

Referring to FIG. 6, in step 600, the controller 216 determines whether the user inputs a command for setting a channel to provide information and information to be displayed. When the controller 216 determines that the user inputs a command for setting a channel to provide information and information to be displayed in step 600, the controller 216 controls the display unit 206 to display a user interface for setting a channel to provide information and information to be displayed in step 601. In step 602, the controller 216 receives a command for setting a channel and information to be displayed via the input unit 210 in step 602.

When the controller 216 determines that the user does not input the command in step 600, the controller 216 controls the browser engine 214 to access the push server 220 via the wired/wireless communication unit 218, and uploads user input information in step 603. When the user does not apply any setting to information, the information can be set via the web pages that the server sets using Open API, etc. The controller 216 receives and updates web pages related to the information.

In step 604, the controller 216 receives a channel switching command and determines whether the channel to be switched to is a channel to provide information in step 606. That is, the controller 216 determines whether to provide a snapshot during the channel switching operation in step 606.

When the controller 216 determines that the channel is not a channel to provide information in step 606, the controller 216 controls the display unit 206 to display a screen where channels are switched in a normal mode, during the channel switching operation in step 608.

In step 636 the controller 216 controls the display unit 206 to display the content corresponding to the switched channel.

When the controller 216 determines that the channel to be switched to is a channel to provide information in step 606, the controller 216 determines whether the storage unit 212 has sufficient storage space to store a snapshot in step 612.

When the controller 216 determines that the storage unit 212 has sufficient storage space in step 612, the controller 216 requests a snapshot from the push server 220 via the wired/wireless communication unit 218 in step 614. When the push server 220 receives the request, the controller 216 controls the browser engine 214 to receive the snapshot in step 616.

When the controller 216 determines that the storage unit 212 does not have sufficient storage space in step 612, the controller 216 requests a source URL from the push server 220 via the wired/wireless communication unit 218 in step 618. When the push server 220 receives the request, the controller 216 controls the browser engine 214 to receive the source URL in step 620 and to access the URL in step 622.

When the digital content display system 200 does not have sufficient storage space for storing the snapshots, it does not receive snapshots but instead receives and accesses an URL where the snapshots exists and downloads them. Therefore, the information providing method according to the invention can be applied to digital content display systems with relatively low performance.

Alternatively, the steps 612 to 622 may be omitted.

In step 624, the controller 216 controls the display unit 206 to display a snapshot acquired during the channel switching operation or a snapshot via the access to the URL. When one piece of information is set, the display unit 206 displays only one snapshot. When a number of pieces of information are set, the display unit 206 displays a number of snapshots in order.

In step 627, the controller 216 determines whether the user inputs a selection command via the input unit 210.

When the controller 216 determines that the user does not input a selection command in step 627, the controller 216 controls the display unit 206 to display the snapshot for a period of time in step 634, and to display the content corresponding to the switched channel in step 636, after the period of time has elapsed. The period of time is a channel zapping delay.

When the controller 216 determines that the user inputs a selection command in step 627, the controller 216 controls the browser engine 214 to access a corresponding website via the wired/wireless communication unit 218 in step 630, and controls the display unit 206 to display web pages from the website in step 632.

Although FIG. 6 illustrates a snapshot as the type of information being displayed during the channel switching process, it should be understood that the present invention is not limited to this type of information.

Figure 7:
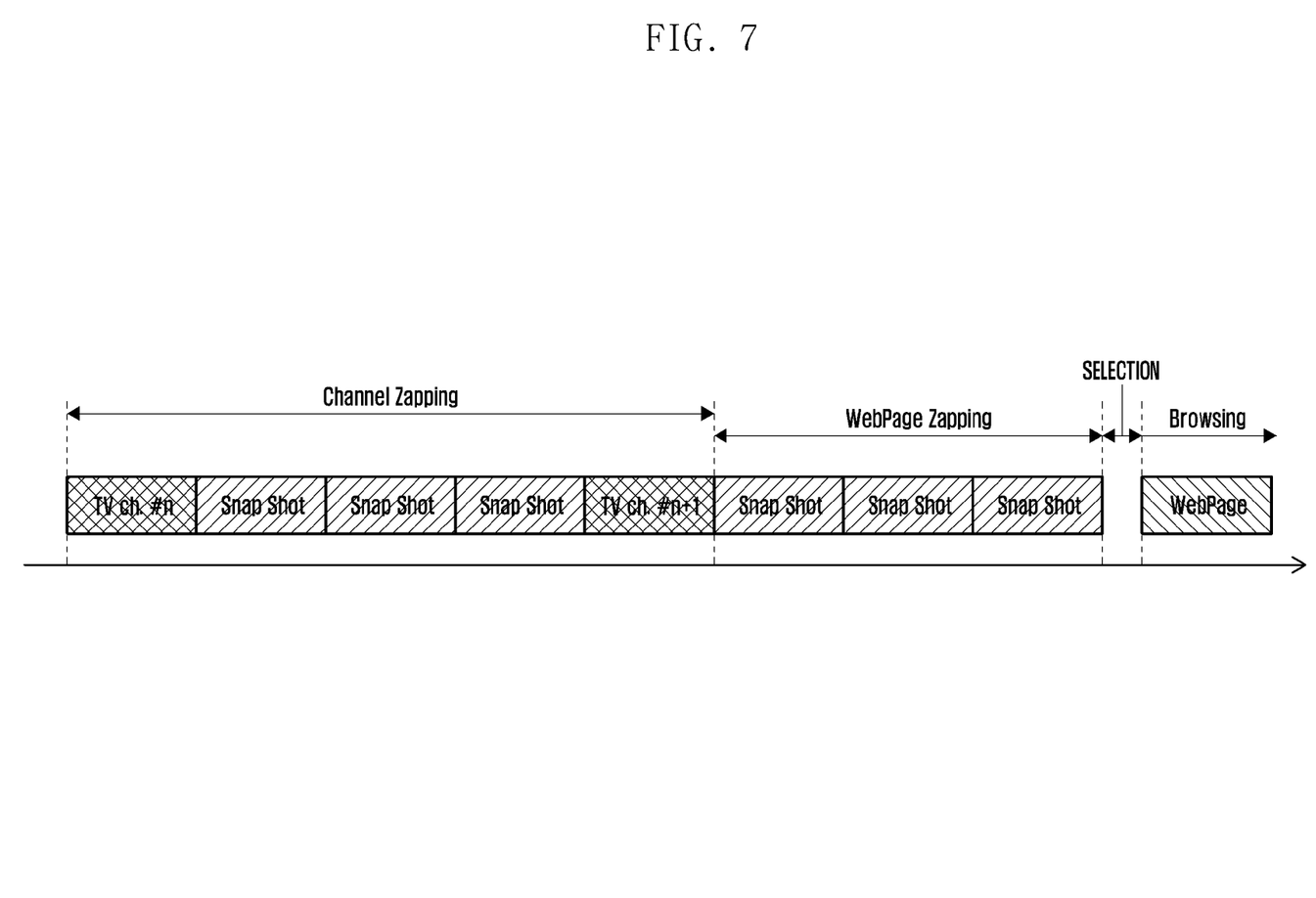
FIG. 7 illustrates a time sequence when providing information during a channel zapping delay in a digital content display system according to an embodiment of the present invention.

FIG. 7 illustrates a time sequence when providing information during a channel zapping delay in a digital content display system according to an embodiment of the invention.

Referring to FIG. 7, TV channel, #n+1, refers to a channel to provide information. Channel zapping occurs between TV channels #n and #n+1 and a number of snapshots are set to be displayed. There are three snapshots between TV channel #n and #n+1, and these are displayed on the display unit 206. When the user does not selects any snapshot, Channel #n is switched to Channel #n+1.

A channel following TV channel, #n+1, is also set to provide information. When TV channel #n+1 follows a web channel, it may be switched to the web channel, which is called a webpage zapping. There are three snapshots between TV channel #n+1 and the following web channel, and these are displayed on the display unit 206. When the user selects the third snapshot, the browser engine 214 connects to the selected website, and thus, web pages are displayed on the display unit 206.

As described above, the digital content display systems and methods, according to the above-described embodiments of the present invention, provide user requested information during a zapping delay created when channels are switched.

Although certain embodiments of the present invention have been described in detail hereinabove, it should be understood that many variations and modifications of the basic inventive concept herein described, which may be apparent to those skilled in the art, will still fall within the spirit and scope of the present invention as defined in the appended claims and their equivalents.

What is claimed is:

1. An information providing method via a digital content display apparatus, the method comprising:
setting, via a displayed user interface, a channel to provide zap information to be displayed during a channel zapping delay, and setting the zap information corresponding to the set channel;
displaying content corresponding to a previous channel command;
accessing a website as a background operation with the content being displayed;
receiving the zap information from the website with the content being displayed;
receiving a new channel command for a channel switching operation to a new channel;
determining whether the new channel indicated by the new channel command corresponds to the set channel;
if the new channel corresponds to the set channel, displaying the zap information corresponding to the new channel during the channel zapping delay; and
displaying content corresponding to the new channel command, when the channel zapping delay is finished.

2. The method of claim 1, further comprising:
interrupting the channel switching operation, when a user selects an element included in the displayed zap information;
accessing a website corresponding to the selected element included in the displayed information; and
displaying accessed website.

3. The method of claim 1, further comprising:
if the new channel does not correspond to the set channel, operating in a normal mode during the channel zapping delay, and displaying information configured for the normal mode.

4. The method of claim 1, wherein the zap information to be displayed includes at least one of an image, a summarized web page, a Uniform Resource Locator (URL), and a snapshot.

5. The method of claim 1, wherein the zap information to be displayed is received before receiving the new channel command.

6. The method of claim 1, wherein receiving the zap information comprises:
receiving the new channel command;
requesting the zap information to be displayed from a push server; and
receiving the zap information to be displayed from the push server,
wherein the zap information corresponds to the new channel.

7. The method of claim 6, wherein the push server accesses a website, receives the zap information from the website, and transmits the zap information to be displayed to the digital content display apparatus.

8. The method of claim 6, wherein the push server is located outside of the digital content display apparatus.

9. The method of claim 1, wherein the background operation includes accessing the website without a user's input and without displaying the accessing process.

10. A digital content display apparatus comprising:
a digital broadcast receiver that receives digital broadcast signals;
a communication unit that transmits and receives data and the digital broadcast signals;

a browser engine that browses web pages according to a user browsing request;

a storage unit that stores an application program and data; and a controller configured to control to set, via a displayed user interface, a channel to provide zap information to be displayed during a channel zapping delay, and to set the zap information corresponding to the set channel, to display content corresponding to a previous channel command, to access a website as a background operation with the content being displayed, to receive the zap information from the website with the content being displayed, to receive a new channel command for a channel switching operation to a new channel, to determine whether the new channel indicated by the new channel command corresponds to the set channel, if the new channel corresponds to the set channel, to display the zap information corresponding to the new channel during the channel zapping delay, and to display content corresponding to the new channel command, when the channel zapping delay is finished.

11. The digital content display apparatus of claim 10, wherein the controller is further configured to interrupt the channel switching operation, when a user selects an element included in the displayed zap information, to access a website corresponding to the selected element, and to display the accessed website.

12. The digital content apparatus of claim 10, wherein the controller is further configured to operate, if the new channel does not correspond to the set channel, in a normal mode during the channel zapping delay, and to display information configured for the normal mode.

13. The digital content display apparatus of claim 10, wherein the zap information to be displayed comprises at least one of:

an image;
a summarized web page;
a Uniform Resource Locator (URL); and
a snapshot.

14. The digital content display apparatus of claim 10, wherein the zap information to be displayed is received before the new channel command is received.

15. The digital content display apparatus of claim 10, wherein the controller is further configured to receive the new channel command, to request the zap information to be displayed from a push server, and to receive the zap information to be displayed from the push server, and wherein the zap information corresponds to the new channel.

16. The digital content display apparatus of claim 15, wherein the push server accesses a website, receives the zap information from the website, and transmits the zap information to the digital content display apparatus.

17. The digital content display apparatus of claim 15, wherein the push server is located outside of the digital content display apparatus.

18. The digital content display apparatus of claim 10, wherein the background operation includes accessing the website without a user's input and without displaying the accessing process.

* * * * *